United States Patent [19]

Molzahn et al.

[11] Patent Number: 4,909,026
[45] Date of Patent: Mar. 20, 1990

[54] ADJUSTABLE STUB GUARD ASSEMBLY FOR CORP CUTTING APPARATUS

[75] Inventors: Herbert W. Molzahn, Winnipeg, Canada; David Jordan, Broken Arrow, Okla.

[73] Assignee: Macdon Industries, Ltd., Winnipeg, Canada

[21] Appl. No.: 252,999

[22] Filed: Oct. 4, 1988

[51] Int. Cl.[4] ............................................. A01D 55/02
[52] U.S. Cl. ......................................... 56/298; 56/310
[58] Field of Search ................ 56/298, 299, 301, 307, 56/308, 309, 310, 311, DIG. 24

[56] References Cited

U.S. PATENT DOCUMENTS

| | | | |
|---|---|---|---|
| 3,401,513 | 9/1968 | Rickerd | 56/298 |
| 4,530,204 | 7/1985 | Brooks | 56/298 |

FOREIGN PATENT DOCUMENTS 0208026  1/1987  European Pat. Off. .............. 56/298
2546367  5/1984  France .

Primary Examiner—William P. Neuder
Attorney, Agent, or Firm—Larson and Taylor

[57] ABSTRACT

The adjustment between the stub guards of a sickle knife arrangement of a crop cutting apparatus is improved by the provision of an adjustment plate which is positioned between the upper stub guard and the support bar. The upper and lower stub guards are clamped onto the support bar by carriage bolts with the lower stub guard engaging against the under surface of the support bar and the upper stub guard engaging against the upper surface of the adjustment plate. The spacing and orientation of the adjustment plate relative to the support bar is adjusted by the three set screws which are threaded into the adjustment plate and engaged against the upper surface of the support bar. The adjustment technique is simple, requires few parts and avoids the necessity for shims.

13 Claims, 2 Drawing Sheets

ADJUSTABLE STUB GUARD ASSEMBLY FOR CORP CUTTING APPARATUS

BACKGROUND OF THE INVENTION

This invention relates to an adjustable stub guard assembly for the sickle knife of a crop cutting apparatus such as a swather or combine harvester.

The cutting knife of a crop cutting apparatus of this type generally comprises a horizontal support bar or flange supported on the apparatus for movement across the ground in a cutting action. On the support bar is mounted a plurality of stub guards which are arranged in pairs with one clamped above the support bar and the other clamped below the support bar at a position aligned with the upper stub guard. Generally each stub guard is formed as an integral cast body defining a pair of forwardly projecting fingers which are connected by transverse bars with the fingers of the upper stub guard cooperating with the fingers of the lower stub guard to define a channel across the front of the support bar within which a reciprocating knife is guided.

To obtain a proper cutting action it is necessary to adjust the spacing between the upper stub guard and the lower stub guard to accurately confine the knife and cause a cutting action between the knife blades and machined surfaces on the stub guards. The adjustment must be controlled within narrow tolerances to optimize the cutting action without providing excessive frictional engagement between the stub guards and the knife in its reciprocating movement.

Conventionally this adjustment is provided by shims which are inserted between the stub guards and the support bar. However this technique is an inaccurate, inconvenient and time consuming process which must be regularly repeated during routine maintenance of the equipment in view of wear which occurs between the knife arrangement and the stub guards.

One proposal has been put forward by Hesston Corporation and is described in French patent application No: 2,546,367 in which the upper stub guard is modified so that it includes an adjustment plate which is clamped between the support bar and the under surface of the upper stub guard. The height of the adjustment plate from the support bar is then adjusted by the insertion of shims on the clamping bolts clamping the upper and lower stub guards together. The upper stub guard is in addition modified by the insertion of set screws which engage upon the upper surface of the adjustment plate so as to adjust the angle between the upper stub guard and the adjustment plate and thus vary the dimensions of the channel through which the knife arrangement runs.

This proposal is however unsatisfactory for a number of reasons and it is one object of the present invention to provide a further improved crop cutting apparatus of this general type in which adjustment of the stub guards can be obtained while using a device of simple and economic construction.

SUMMARY OF THE INvENTION

According to the first aspect of the invention therefore there is provided a crop cutting apparatus comprising a forwardly facing horizontal support bar, means carrying the support bar for movement across the ground in a forward movement for cutting a standing crop, a horizontally reciprocal knife arrangement including a plurality of blades thereon, a plurality of upper knife guards and a corresponding plurality of lower knife guards arranged in cooperating pairs above and below the support bar respectively, a screw threaded fastener clamping each pair of upper and lower knife guards on the support bar so as to project forwardly therefrom and define a channel therebetween across the front of the support bar in which the knife arrangement reciprocates, and an adjustment plate positioned between the support bar and one of said upper and lower knife guards, said adjustment plate having a plurality of set screws mounted therein and projecting therefrom to engage the support bar, the set screws being adjustable to alter the spacing between the adjustment plate and the support bar so as to adjust the dimension of the channel.

According to a second aspect of the invention there is provided a crop cutting apparatus comprising a forwardly facing horizontal support bar, means carrying the support bar for movement across the ground in a forward movement for cutting a standing crop, a horizontally reciprocal knife arrangement including a plurality of blades thereon, a plurality of upper knife guards and a corresponding plurality of lower knife guards arranged in cooperating pairs above and below the support bar respectively, each of said knife guards comprising a body defining two forwardly extending knife arrangement support portions and at least one transverse connecting bar, two separate screw threaded fasteners clamping each pair of upper and lower knife guards on the support bar so that the support portions project forwardly therefrom and define a channel therebetween across the front of the support bar in which the knife arrangement reciprocates guided by the support portions, one of the upper and lower knife guards having a surface thereof cooperating with a surface on the support bar to constrain said one knife guard in a predetermined orientation relative to the support bar, an adjustment plate positioned between the support bar and the other of said upper and lower knife guards, a surface of the adjustment plate remote from the support bar cooperating with a surface of the other knife guard to constrain the other knife guard in a predetermined orientation relative to the adjustment plate and a plurality of set screws mounted in the adjustment plate and projecting therefrom to engage the support bar, at least one of the set screws being arranged forwardly of a line joining the screw threaded fasteners and at least one of the set screws being arranged rearwardly of a line joining the screw threaded fasteners, the set screws being adjustable to alter the spacing between the adjustment plate and the support bar so as to adjust the dimensions of the channel.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
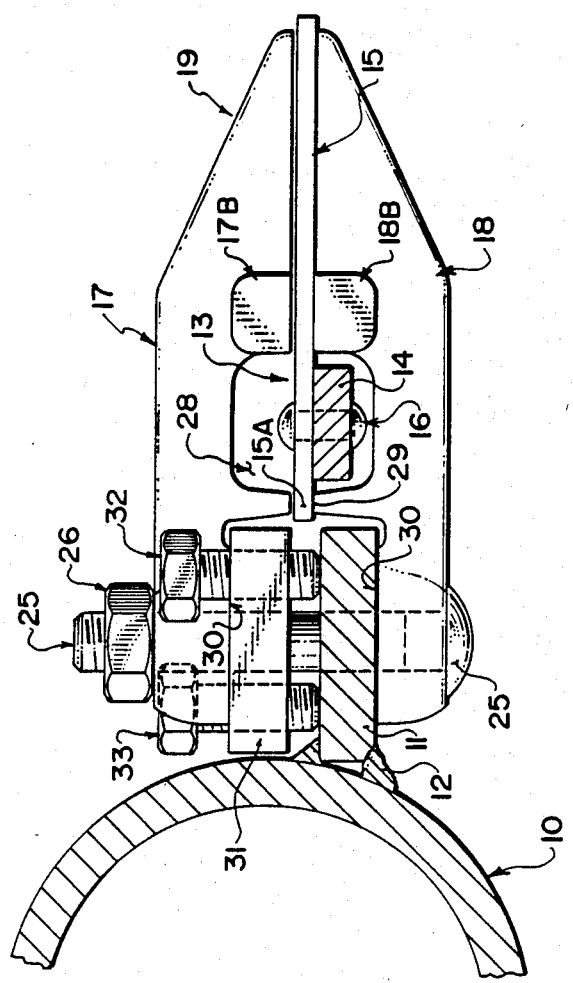
FIG. 1 is a side elevational view of one pair of stub guards of a crop cutting apparatus according to the invention.
Figure 2:
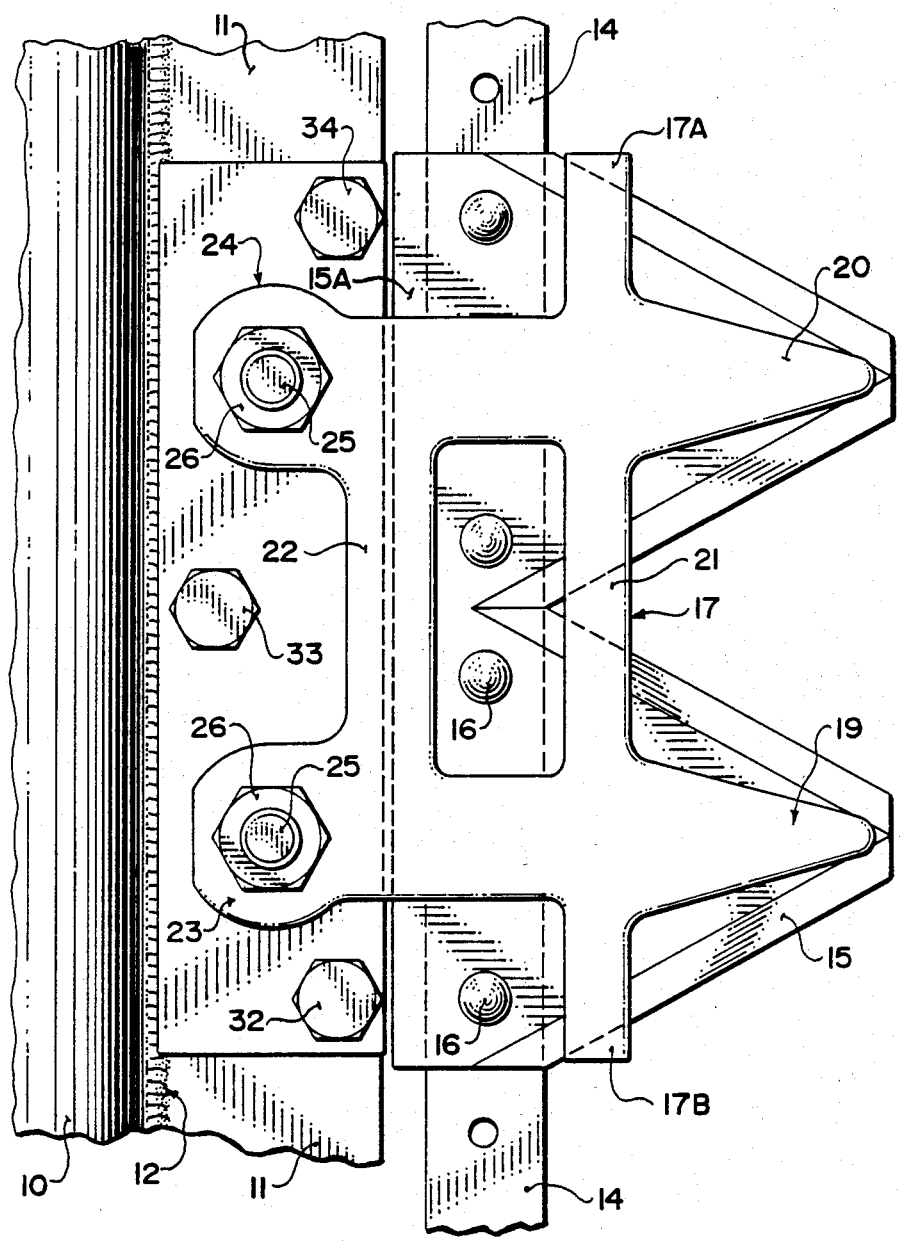
FIG. 2 is a top plan view of the embodiment of FIG. 1.

The crop cutting apparatus shown in FIGS. 1 and 2 comprises a frame member 10 only a part of which is shown since this is of conventional construction. The attachment of the frame to suitable ground wheels and a suitable traction unit are not shown as these are of a conventional nature and are not involved in the present invention. The frame 10 carries a support flange or support bar 11 which projects forwardly from the frame and extends in a horizontal plane across a front surface of the frame. The flange or support bar is shown attached by weld lines 12 but this is one example only of the mounting techniques since the flange itself is again of a conventional structure. The flange extends along substantially the full width of the frame so as to carry the sickle knife described in more detail hereinafter.

As well known by one skilled in the art, the support bar 11 carries a plurality of stub guards or knife guards, arranged in side by side relation across the full length of the support bar. The stub guards act to support and guide a knife arrangement generally indicated at 13 which includes a knife bar 14 and a plurality of generally triangular blades 15 attached to the bar by rivets 16. Again the knife arrangement is of conventional construction and is driven by a suitable reciprocating drive mechanism (not shown) at one end or both ends of the knife arrangement so as to move the bar in a reciprocating action along its length to drive the triangular blades back and forth across the guards in a cutting action.

The single stub guard assembly shown in FIGS. 1 and 2 comprises a cooperating pair of guards including an upper stub guard 17 and a lower stub guard 18 which are identical. As shown in plan the upper stub guard 17 comprises a pair of forwardly projecting fingers 19 and 20 which are interconnected by two transverse coupling bars 21 and 22. A rearward end of each of the fingers 19 and 20 has a circular boss portion 23 and 24 which can receive a carriage bolt 25 and cooperating nut 26 by which the upper and lower stub guards are clamped onto the flange 11.

The bar 21 projects outwardly from the sides of the fingers 19 and 20 and defines stub bar portions 17A and 17B which cooperate with the similar portions of the next adjacent stub guards to define a continuous surface along which the knife arrangement can slide.

As best shown in FIG. 1 the stub guards are shaped in side elevation to define planar surfaces at a forward end of the fingers and underneath the coupling bar 21 with the edges of the planar surfaces being machined to cooperate with the knife blades 15. Rearwardly of the planar surfaces is defined an open area 28 within which the bar 14 and the rivets 16 move. A rearmost edge of the knife blades as indicated at 15A runs over a rear wear surface 29 of each of the stub guards so the knife arrangement is confined in its sliding action by the channel defined between the upper and lower stub guards. As shown in FIG. 1 there is a slight clearance between the knife arrangement and the stub guards but this clearance must of course be adjusted to a required tolerance to ensure that the knife arrangement is properly guided while no excessive friction is applied to the sliding action of the knife arrangement.

The above features of the device are generally conventional and are described herein for completeness. The invention relates to the adjustment and positioning of the knife guards relative to the flange 11 which will now be described.

An upper surface of the lower knife guard 18 indicated at 30 comprises a flat horizontal surface which is arranged to directly engage the underside of the flange 11. The direct engagement therebetween ensures that the lower stub guard is oriented in a predetermined position that is extending directly outwardly from the flange 11 and remains in that position at all times.

The positioning of the upper stub guard 17 is obtained by the provision of an adjustment plate 31 and three set screws 32, 33 and 34.

The adjustment plate comprises an elongate flat plate of transverse width approximately equal to the width of the flange 11 and a length substantially equal to the full length of the single stub guard so that the adjustment plate of a next adjacent stub guard lies end to end but slightly spaced from the adjustment plate 31. The adjustment plate has a pair of holes of sufficient size and positioning to freely receive the carriage bolts 25 so the clamping action of the stub guards onto the flange takes place through the adjustment plate.

The set screws 32 and 34 are arranged at opposed ends of the adjustment plate and on a forward side of a line joining the carriage bolts 25. The set screw 33 is positioned at a midpoint along the length of the adjustment plate and at a position rearwardly of the line joining the carriage bolts. The set screws 32, 33 and 34 include an upper head and a screw threaded portion which extends through a female screw thread in the adjustment plate so that rotation of the set screw alters that portion of the set screw extending beyond the under surface of the adjustment plate into contact with the upper surface of the flange 11.

The under surface 30 of the upper stub guard cooperates with an upper surface of the adjustment plate so that the orientation of the upper stub guard is controlled in dependence upon the orientation of the adjustment plate.

In operation, therefore, the orientation and spacing of the upper stub guard relative to the lower stub guard is adjusted by varying the adjustment of one or more of the set screws 32, 33 and 34 together with a releasing or application of the clamping action provided by the carriage bolts 25. Thus the spacing along the full length of the fingers 19 and 20 can be increased by releasing the nuts 26 while extending the set screws 32, 33 and 34 in equal amounts. A twisting action tending to increase or decrease the spacing of the fingers at the forward or rearward ends can be obtained by differentially adjusting the set screws 32 and 34 relative to the set screw 33. An adjustment of the spacing between the fingers 19 relative to the spacing between the fingers 20 can be obtained by differential adjustment of the set screws 32 and 34 so the twisting action occurs about the midline of the adjustment plate and the set screws 33.

In this way the channel within which the knife arrangement runs can be adjusted more accurately, more quickly and more easily by the simple operation upon the nuts and the set screws 32, 33 and 34 without the necessity of the addition or removal of any shims. In this way the cooperation between the knife arrangement and the stub guards can be more accurately controlled to obtain a more effective cutting action and to avoid undue wear.

The embodiment described above has the following advantages relative to the prior art as shown in French application No: 2,546,367 of Hesston.

1. The upper and lower stub guards can be identical. The customer can therefore stock only one part number rather than two individual parts. It will be appreciated that the stub guards are a part which is subject to wear and damage and thus have to be replaced regularly.
2. The design is significantly simpler and requires much fewer number of parts thus tending to reduce cost and simplify parts inventory.
3. The upper guard may have a hardened wear area in contact with the rear portion of the knife blade acting to hold down and guide the knife blade in comparison with the prior art device in which the upper adjuster plate performs this function, making it subject to wear and replacement.
4. The set screws are provided in a non-wearing part and thus have no need for regular replacement. In the prior art device, the set screws are provided in the upper stub guard which as stated above is a part subject to wear and hence regular replacement. In the present invention the set screws are provided in the adjustment plate which can remain unchanged when the stub guards are replaced during the regular maintenance.
5. The set screws are positioned in a simple flat adjustment plate which is subject to little stress. In the prior art device the set screws are positioned in the stub guards at a position of high stress thus significantly weakening the upper guard.
6. The stub guards can be of a conventional design without the necessity for manufacture of specialized parts.
7. The adjustment of the clearance between the stub guards both at the front and the rear can be obtained merely by adjustment of the set screws without the necessity for insertion of any shims, as opposed to the prior art device in which only a part of the adjustment is obtained by set screws with a further part of the adjustment requiring the insertion of shims which is of course a difficult and time consuming operation leading to less accurate adjustment.

Since various modifications can be made in our invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A crop cutting apparatus comprising a forwardly facing horizontal support bar, means carrying the support bar for movement across the ground in a forward movement for cutting a standing crop, a horizontally reciprocal knife arrangement including a plurality of blades thereon, a plurality of upper knife guards and a corresponding plurality of lower knife guards arranged in cooperating pairs above and below the support bar respectively, a screw threaded fastener clamping each pair of upper and lower knife guards on the support bar so as to project forwardly therefrom and define a channel therebetween across the front of the support bar in which the knife arrangement reciprocates, and an adjustment plate positioned between the support bar and one of said upper and lower knife guards, the adjustment plate having a surface thereof remote from the support bar cooperating with a surface of said one knife guard and supporting said one knife guard in cantilever arrangement extending forwardly therefrom in a fixed orientation relative to the adjustment plate, said adjustment plate having a plurality of internally threaded openings therethrough each receiving therein a respective one of a plurality of externally threaded set screws, each of the set screws being rotatable to alter the extent of projection of an end of the set screw from the adjustment plate, the ends of the set screws cooperating with the support bar such that rotation of the set screws causes a variation in the spacing between the adjustment plate and the support bar so as to adjust the dimension of the channel.

2. The invention according to claim 1 wherein said set screws include at least one set screw forwardly of said screw threaded fastener and at least one set screw rearwardly of said screw threaded fastener so as to adjust the angle between the upper and lower knife guards.

3. The invention according to claim 1 wherein each upper knife guard and each lower knife guard comprises body defining two forwardly extending knife arrangement support portions and at least one transverse connecting bar therebetween, the adjustment plate being arranged to extend across both of said support portions, and wherein there is provided two separate screw threaded fasteners for clamping said knife guards at positions spaced longitudinally of the support bar.

4. The invention according to claim 3 wherein there are two set screws on one side of a line joining said two separate screw threaded fasteners and one set screw on an opposed side of said line.

5. The invention according to claim 1 wherein means for adjusting the dimensions of the channel consist solely of said adjustment plate and said set screws.

6. The invention according to claim 1 wherein the upper and lower knife guards are identical.

7. The invention according to claim 1 wherein either one or both the upper and lower knife guards include a contact surface for engaging the knife arrangement at a rear edge of the knife arrangement.

8. The invention according to claim 1 wherein the knife arrangement is contacted in the channel solely by the upper and lower knife guards.

9. A crop cutting apparatus comprising a forwardly facing horizontal support bar, means carrying the support bar for movement across the ground in a forward movement for cutting a standing crop, a horizontally reciprocal knife arrangement including a plurality of blades thereon, a plurality of upper knife guards and a corresponding plurality of lower knife guards arranged in cooperating pairs above and below the support bar respectively, each of said knife guards comprising a body defining two forwardly extending knife arrangement support portions and at least one transverse connecting bar, two separate screw threaded fasteners clamping each pair of upper and lower knife guards on the support bar so that the support portions project forwardly therefrom and define a channel therebetween across the front of the support bar in which the knife arrangement reciprocates guided by the support portions, one of the upper and lower knife guards having a surface thereof cooperating with a surface on the support bar to constrain said one knife guard in a predetermined orientation relative to the support bar, an adjustment plate positioned between the support bar and the other of said upper and lower knife guards, a surface of the adjustment plate remote from the support bar cooperating with a surface of the other knife guard to constrain the other knife guard in a predetermined orientation relative to the adjustment plate and a plurality of set screws mounted in the adjustment plate and projecting therefrom to engage the support bar, at least one of the set screws being arranged forwardly of a line joining the screw threaded fasteners and at least one of the set screws being arranged rearwardly of a line joining the screw threaded fasteners, the set screws being adjustable to alter the spacing between the adjustment plate and the support bar so as to adjust the dimensions of the channel.

10. The invention according to claim 9 wherein means for adjusting the dimensions of the channel consist solely of said adjustment plate and said set screws.

11. The invention according to claim 9 wherein the upper and lower knife guards are identical.

12. The invention according to claim 9 wherein either one or both the upper and lower knife guards include a contact surface for engaging the knife arrangement at a rear edge of the knife arrangement.

13. The invention according to claim 9 wherein the knife arrangement is contacted in the channel solely by the upper and lower knife guards.

* * * * *